(12) United States Patent
Deysarkar et al.

(10) Patent No.: US 10,703,963 B1
(45) Date of Patent: Jul. 7, 2020

(54) SYSTEMS AND METHODS OF HYDRATING POLYMER ADDITIVES

(71) Applicant: PfP Industries, LLC, Houston, TX (US)

(72) Inventors: Asoke Kumar Deysarkar, Houston, TX (US); Michael Joseph Callanan, IV, Houston, TX (US); Robert Ray McDaniel, Cypress, TX (US); Brian James Keola DeCaires, Cypress, TX (US)

(73) Assignee: PfP Industries, LLC, Houston, TX (US)

( * ) Notice: Subject to any disclaimer, the term of this patent is extended or adjusted under 35 U.S.C. 154(b) by 0 days.

(21) Appl. No.: 16/556,566

(22) Filed: Aug. 30, 2019

(51) Int. Cl.
*C09K 8/80* (2006.01)
*C09K 8/24* (2006.01)

(52) U.S. Cl.
CPC ............... *C09K 8/80* (2013.01); *C09K 8/24* (2013.01); *C09K 2208/28* (2013.01)

(58) Field of Classification Search
None
See application file for complete search history.

(56) References Cited

U.S. PATENT DOCUMENTS

| | | | | |
|---|---|---|---|---|
| 4,422,947 A | * | 12/1983 | Dorsey | C09K 8/08 507/110 |
| 5,052,486 A | * | 10/1991 | Wilson | B01F 3/0861 166/308.4 |
| 5,190,374 A | | 3/1993 | Harms et al. | |
| 5,447,394 A | | 9/1995 | Shepard | |
| 9,022,120 B2 | | 5/2015 | Zamora et al. | |
| 2004/0218463 A1 | | 11/2004 | Allen | |
| 2007/0173412 A1 | * | 7/2007 | Allin | C09K 8/512 507/224 |
| 2008/0261836 A1 | * | 10/2008 | Filler | C09K 8/34 507/260 |
| 2008/0264641 A1 | | 10/2008 | Slabaugh et al. | |
| 2012/0273206 A1 | * | 11/2012 | Zamora | C09K 8/68 166/308.1 |
| 2013/0150268 A1 | * | 6/2013 | Oldham | C09K 8/62 507/215 |
| 2013/0261032 A1 | * | 10/2013 | Ladva | C09K 8/00 507/131 |
| 2014/0364344 A1 | * | 12/2014 | Weinstein | C09K 8/68 507/219 |
| 2014/0364346 A1 | * | 12/2014 | Weinstein | B01F 3/1271 507/225 |
| 2015/0240148 A1 | | 8/2015 | Luharuka et al. | |
| 2017/0037696 A1 | | 2/2017 | Lopez et al. | |
| 2018/0001513 A1 | | 1/2018 | Saffioti | |

FOREIGN PATENT DOCUMENTS

WO 2008084192 A1 7/2008

* cited by examiner

*Primary Examiner* — John J Figueroa
(74) *Attorney, Agent, or Firm* — Vorys, Sater, Seymour and Pease LLP

(57) ABSTRACT

A method includes flowing a hydrating liquid in an extensional flow regime through an elongated passageway of an extender, wherein a flow rate of the hydrating liquid and a diameter of the elongated passageway are sufficient to achieve a Reynolds number of 20,000 or greater. A hydratable additive is added to the hydrating liquid in the elongated passageway to produce a mixture comprising the hydratable additive that is at least partially hydrated.

18 Claims, 2 Drawing Sheets

SYSTEMS AND METHODS OF HYDRATING POLYMER ADDITIVES

BACKGROUND

In the oil and gas industry, hydrocarbons are obtained from subterranean geologic formations by drilling a well that penetrates one or more hydrocarbon-bearing formations. The well provides a flowpath for the hydrocarbons to reach the surface, and production of the hydrocarbons to the surface occurs when a sufficiently unimpeded flowpath from the hydrocarbon-bearing formation to the wellbore is present.

The majority of subterranean formations produced today have low natural permeability. To improve permeability and well productivity, hydrocarbon-bearing formations are commonly subjected to a hydraulic fracturing operation, also commonly referred to as "fracking." Hydraulic fracturing entails pumping a fracturing fluid downhole under high pressure and high flow rates and injecting the fracturing fluid into adjacent hydrocarbon-bearing formations to create, open, and extend formation fractures. Fracturing fluids usually contain propping agents, commonly referred to as "proppant" or "proppant particulates," that are carried into the fractures and deposited to hold or "prop" open the fractures once the fluid pressure is reduced. Propping the fractures open enhances permeability by allowing the fractures to serve as conduits for hydrocarbons trapped within the formation to flow to the wellbore.

Most fracturing fluids contain one or more additives to viscosify the fracturing fluid and thereby aid in transporting the fracturing fluid and proppant deeper into the fractures. Common viscosifying additives include hydrophilic polymers and guar. Preferred viscosity levels for the fracturing fluids are reached when the viscosifying additive becomes properly hydrated. The term "hydration" refers to the process wherein a hydratable material solvates or absorbs water (hydrates) and swells in the presence of water. Most commonly, a viscosifying additive is added to a fracturing fluid from a non-hydrated or poorly hydrated concentrate. High-shear blending protocols may provide more effective polymer hydration but result in polymer chain scission, which reduces the viscosity of the fluid and compromises the ability of the polymer to transport the proppant. Further, in most instances, conventional fracturing fluid formulation processes do not result in instantaneous hydration, thereby necessitating a wait time or multistage hydration protocol. Moreover, high-shear mixing (blending) may or may not cause a reduction in viscosity but it will damage the structure of the polymer, which can translate to a reduced ability to transport proppant.

As an alternative to waiting, slower hydrating polymers (e.g., guar gum) and faster hydrating polyacrylamides do not go through a pre-hydration step but rather are expected to hydrate "on the fly" as they are pumped. These polymers complete their hydration either in the tubular goods or early in the fracture. This approach currently is necessary to save time and labor but may not result in obtaining maximum performance properties out of the polymer and the concentration that is being utilized.

Multistage hydration protocols used to generate high viscosity fracturing fluids can be challenging, particularly at remote sites or when large fluid and proppant volumes are required. Special equipment for mixing the dry additives with water is required, and problems such as chemical dusting, uneven mixing, and lumping can often result. Lumping occurs when the initial contact of the dry additive with the water results in rapid hydration of the outer layer of the material, which creates a sticky, rubbery exterior layer that prevents the interior portions of the material from contacting the water. The result is the formation of "gel balls" or "fish eyes," which can encumber efficiency by lowering the viscosity achieved per pound of dry additive and also by creating insoluble particles that can restrict flow both into and out of the subterranean formations. Consequently, merely mixing the dry additive directly with water often does not generate a homogeneous fracturing fluid, which is one reason why liquid forms of the polymers (e.g., concentrates) are preferred.

Thus, there is still a need in the art for more effective systems and methods for hydrating dry additives used in the production of fracturing fluids.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
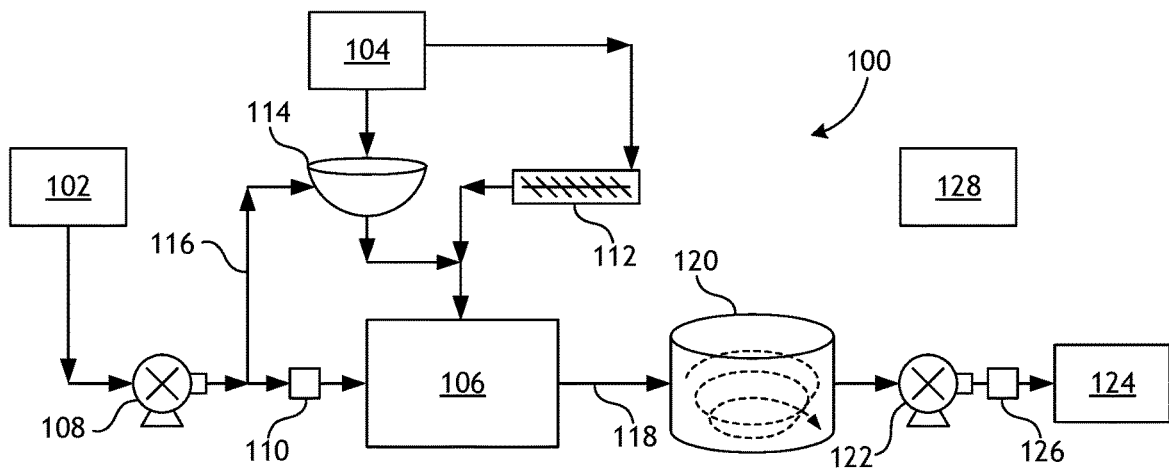
FIG. 1 is a schematic diagram of an example blending system that may incorporate one or more principles of the present disclosure.

The present disclosure is related to hydraulic fracturing fluids and, more particularly, to improved systems and methods of hydrating additives, especially dry additives, for use in hydraulic fracturing fluids.

The systems and methods disclosed herein are primarily applicable to hydratable additives like high molecular weight polymers that are included in fracturing fluids used in the oil and gas industry for hydraulic fracturing operations. However, those skilled in the art will readily appreciate that the principles disclosed herein are equally applicable to other industries including, but not limited to, food production, fertilizer production, paint production, and the like.

The oil and gas industry has recently begun to utilize and incorporate high-viscosity friction reducers (HVFR) in hydraulic fracturing fluids to improve fluid viscosity and proppant transport. Embodiments discussed herein describe improved systems and methods of hydrating additives, especially dry additives, to obtain an HVFR with preferred (enhanced) fluid properties, in particular, dynamic proppant transport. Dynamic transport tests on HVFRs resulting from the hydration techniques described herein have demonstrated effective and improved transport of proppant through surface equipment, the potential to locate higher proppant concentrations within formation fractures, and the creation of increased packed fracture lengths in subterranean formations. Improved proppant transport properties opens up the possibility that a desired fracture design (e.g., propped fracture length) can be achieved at reduced injection rates, which may result in less wear and tear on surface pumping equipment and improved ability to contain created fractures within targeted areas.

Without being limited by theory, it is believed that there are three flow regimes/mechanisms by which polymers can mix with and be hydrated by a hydrating liquid. The first is laminar flow where the only mixing that takes places is between two adjacent layers by diffusion. This diffusion is a slow process and controlled by diffusional coefficient. The second is turbulent flow where two mechanisms are present: diffusion and convective (convection) mixing. Convective mixing is the primary mechanism by which mixing and dissolution takes place. In a turbulent regime flow, not only convective mixing takes place, but also diffusion mixing between the layers but with an order of magnitude difference between the two.

The third is extensional flow, which has three mechanisms of mixing: diffusion, convective mixing (very little), and polymer stretching. Because of the high flow rate and small diameter flow path needed to achieve extensional flow, the polymers are immediately stretched when exposed to a hydrating liquid, which allows for flash hydration of the polymer. This ability to flash hydrate is the result of the combination of the polymer stretching, high energy in the form of fluid velocity but with a substantial absence (preferably complete absence) of turbulence and therefore maximizes structure development of the polymer.

Equipment capable of creating an extensional flow condition will allow the hydratable polymer to maximize viscosity and structure development while minimizing the polymer structure's susceptibility to shear degradation.

Methods of the present disclosure utilize an extender in mixing (blending) a hydrating liquid and a hydratable additive. The extender has a design that causes the hydrating liquid to flow through an elongated passageway at a high flow rate to achieve an extensional flow regime at which point the hydratable additive is added to the hydrating liquid. As used herein, the term "extensional flow regime" refers to a flow regime characterized by high momentum diffusion, low momentum convection, and polymer stretching. The extensional flow regime is achieved by the synergistic combination of (a) a high flow rate through the elongated passageway of the extender and (b) a size and shape of the elongated passageway to achieve a Reynolds number (e.g., 20,000 or greater) through the passageway with little to no turbulence or eddies. Such flow rates with viscous fluids are associate with turbulent flow, which produces significant eddies. In contrast, the inlet, elongated passageway, and outlet of the extender are designed to achieve little to no turbulence or eddies as high flow rates.

In some embodiments, the elongated passageway may be designed without or otherwise not including any moving parts that might inadvertently cause shear. Without being bound by theory or mechanism, it is believed that contacting a hydratable additive like a polymer and hydrating liquid in such a manner causes the individual polymer molecules to be wetted and then begin structure development. The smooth, extensional flow regime helps achieve elongation and unfolding of the polymer structure with a minimum of damage (e.g., shortening of the polymer chain) that hydrates more readily.

The extender design then changes to maintain extensional flow but at a lower flow rate than in elongated passageway so that the fluid exiting the extender can be further processed without inducing high shear degradation. Upon leaving the extender, the hydratable additive will be at least partially hydrated and its structure development will have commenced, if not having already been substantially completed. If needed, further processing can include further mixing of the fluid under low shear conditions (±400 sec$^{-1}$) to substantially or fully develop the hydrated structure of the hydratable additive (e.g., achieving 85% to 100% of peak viscosity). Because the polymer structure is elongated and unfolded by the mixing and flow conditions in the extender, the time for such further processing and hydration is minimized.

Unless otherwise specified, viscosity is measured using a commercially-available viscometer, such as an Ofite 900 Viscometer. Hydration rate data related to viscosity can be obtained by comparing samples prepared using the extender designs described herein and connected to a conventional hydration tank with samples that are hydrated for the same amount of time but using a lab mixer. In one example, the total amount of mixing time for each sample was 13 seconds before being placed on the viscometer to record the viscosity build-up. In this example, the viscometer was an Ofite 900 Viscometer which was used to record a 300 RPM reading (511 sec$^{-1}$) at 80° F. Readings were taken at 30 seconds, 1,2,3 and 5 minutes. Tests were run at a polymer loading of 24 ppt (same polymer was used in both tests). The results are shown below in Table 1:

TABLE 1

| Sample | Hydration Equipment | Viscosity (cps) | | | | |
| --- | --- | --- | --- | --- | --- | --- |
| | | 30 sec. | 1 min. | 2 min. | 3 min. | 5 min. |
| 1$^{st}$ Method | Presently Disclosed Extender @ 123 gpm | 12.9 | 17.1 | 28.5 | 33.0 | 33.5 |
| 2$^{nd}$ Method | Lab Mixer @ 1250 RPM | 5.2 | 8 | 14.8 | 21.3 | 24.1 |

As used herein, the term "peak viscosity" refers to the viscosity of a sample when the viscosity is changing by less than 5% over 30 minutes with continuous low shear mixing. A viscosity ($\eta_m$) with X % of the peak viscosity ($\eta_p$) is calculated as $100-((\eta_p-\eta_m)/\eta_p)*100)\geq X$. As used herein, the term "substantially hydrated" refers to a viscosity within 85% of peak viscosity.

Again, without being bound by theory or mechanism, it is believed that by having the hydratable additive substantially to fully hydrated before being introduced to high shear conditions common to mixing in downstream equipment and passing through tubulars, damage to the polymer structure from the high shear conditions may be lessened or avoided. As will be appreciated, this improves shear resistance of the resultant fluid and, when used in fracturing operations, improves dynamic proppant transport capability.

One or more of the presently disclosed methods can include flowing a hydrating liquid in a extensional flow regime where the flow rate and dimensions of the elongated passageway are chosen to achieve a Reynolds number for the hydrating fluid passing through the elongated passageway of 20,000 or greater (e.g., 50,000, 75,000, 100,000 to 800,000, or 250,000 to 750,000, or 400,000 to 600,000). A hydratable additive may then be added to the hydrating liquid in the elongated passageway, such that the hydratable additive becomes at least partially elongated while passing through the elongate passageway, and thereby producing a mixture comprising an at least partially hydrated hydratable additive. The flow rate and dimension of the elongated passageway can be any suitable values to achieve said Reynolds number. By way of nonlimiting example, the volumetric flow rate of the hydrating fluid through the elongated passageway may be at least 50 gallons per minute (gpm) (0.19 m$^3$/min) (e.g., 50 gpm to 200 gpm (0.76 m$^3$/min), or 75 gpm (0.28 m$^3$/min) to 175 gpm (0.66 m³/min), or 100 gpm (0.38 m³/min) to 150 gpm (0.57 m³/min)). By way of another nonlimiting example, the diameter of the elongated passageway at its narrowest may be 45 mm or less (e.g., 10 mm to 45 mm, or 10 mm to 30 mm, or 15 mm to 20 mm). By way of yet another nonlimiting example, using water as the hydrating fluid, with a volumetric flow rate of 115 gpm through the elongated passageway, and a diameter of the elongated passageway at its narrowest of 19 mm yields a Reynolds number of about 500,000.

The viscosity of the mixture within 5 minutes (e.g., 10 seconds to 5 minutes, or 30 seconds to 2 minutes, or 1 minute to 3 minutes, or 2 minutes to 5 minutes) of exiting the elongated passageway may be within 50% of the peak viscosity (e.g., within 50% to 100%, or 50% to 75%, or 60% to 80%, or 75% to 90%, or 80% to 95%, or 80% to 100% of the peak viscosity). As provided in Table 1 above, using the extender described herein can result in reaching 50% of Peak Viscosity in less than 1 minute and 85% of Peak Viscosity in 2 minutes.

The methods of the present disclosure can further include conveying the mixture from the extender to a vessel (e.g., a hydration tank) while in the extensional flow regime and low shear mixing of the mixture within the vessel. At higher hydratable additive concentrations (e.g., 25 pounds per 1000 gallons of the hydrating fluid ppt or more), the mixture exiting the extender may be diluted with additional hydrating liquid (e.g., by introduction into the vessel containing additional hydrating liquid, by mixing with additional hydrating liquid in downstream mixing equipment, or by entraining with additional hydrating liquid in tubulars).

Such methods can be performed in a variety of settings for a variety of applications. One example application is hydraulic fracturing operations for subterranean formations. In a hydraulic fracturing operation, the mixture discharged from the extender or the vessel (e.g., a hydration tank) can be further diluted to a desired hydratable additive concentration and mixed with proppant for use in creating and/or extending at least one fracture in the subterranean formation and introducing the proppant into said fracture. Advantageously, the blending systems to perform such methods do not require a large footprint and can be easily installed at a wellsite for onsite production of the fracturing fluid.

The dynamic proppant transport capability (DPTC) (test method described in the Examples below) of the mixture (diluted or not) produced by the methods/extender described herein may have a % improvement that is greater than the % improvement in DPTC for the same mixture composition produced under traditional high shear mixing for the same amount of mixing time in each. The % improvement in DPTC relative to control (the hydrating fluid without the hydratable additive) may be 20% or greater (e.g., 20% to 75%, or 20% to 40%, or 25% to 50%, or 30% to 60%, or 50% to 75%).

By way of nonlimiting example, FIG. 1 is a schematic flowchart diagram of an example blending system 100 that may incorporate one or more principles of the present disclosure. The blending system 100 may be configured to produce a mixture comprising a hydrated material, such as an HVFR, that may be incorporated into hydraulic fracturing fluids to improve fluid viscosity and proppant transport. The mixture may be blended to a predetermined concentration and diluted to particular downhole loading requirements. The blending system 100 may be implemented and used on site, such as at the site of a drilled wellbore, or may alternatively be implemented at a processing facility.

As illustrated, the blending system 100 includes a hydrating liquid 102, a hydratable additive 104, and a mixing device 106 that receives and mixes (blends) the hydratable additive 104 with the hydrating liquid 102 and thereby initiates the process of hydrating the hydratable additive 104. The hydrating liquid 102 may include any aqueous fluid, such as water or a solution comprising water. In some embodiments, the hydrating liquid 102 may comprise fresh water, but may alternatively comprise any suitable concentration and/or mixture of salts (e.g., saltwater, brackish water, or brine), without departing from the scope of the disclosure. The hydrating liquid 102 may be sourced from a local storage tank, such as a "frac" tank, but may alternatively originate from an adjacent body of water, such as a lake, a river, the sea, a surface reservoir, or a subterranean reservoir. The hydrating liquid 102 may also comprise produced water from the subterranean reservoir and/or a previous fracturing treatment.

The blending system 100 may also include a first or "mixing" pump 108 that conveys (pumps) the hydrating liquid 102 to the mixing device 106. The mixing pump 108 may be, for example, a centrifugal pump. In some embodiments, a flow meter 110 may be placed inline before or after the mixing pump 108 to measure the amount of the hydrating liquid 102 that is provided to the mixing device 106. As will be appreciated, this may help determine how much hydratable additive 104 must be introduced into the mixing device 106 to meet predetermined concentrations. In some embodiments, for example, the mixing pump 108 may be operated to provide about 400 gallons per minute (gpm) of the hydrating liquid 102 through the mixing device 106.

The hydratable additive 104 may be in the form of a powder, fine granules, or a liquid (e.g., a concentration, a suspension, an emulsion, or a slurry). Suitable materials for the hydratable additive 104 include, but are not limited to, polymers, clays, and the like, and any combination thereof. In at least one embodiment, the hydratable additive comprises a polymer suspended in a fluid (e.g., suspended in a hydrocarbon or suspended as an emulsion).

In some embodiments, the hydratable additive 104 may include natural and derivatized hydratable polymers, such as polysaccharides, biopolymers, and other polymers. Examples of polymers that may be used include, but are not limited to, arabic gums, cellulose, karaya gums, xanthaii, tragacanth gums, ghatti gums, carrageenin, psyllium, acacia gums, tamarind gums, guar gums, locust bean gums, and the like. Modified gums, including carboxyalkyl derivatives, such as carboxymethyl guar and hydroxyalkyl derivatives such as hydroxypropyl guar (HPG), can also be employed. Doubly derivatized gums such as carboxymethyl hydroxypropyl guar (CMHPG) can also be used. Generally, carboxyalkyl guar, carboxyalkylhydroxyalkyl guar, and the like may be used, wherein the alkyl groups may comprise methyl, ethyl or propyl groups. In some embodiments, galactomanans such as guar, including natural, modified, or derivative galactomanans, may be used.

In some embodiments, the hydratable additive 104 may comprise a cellulose. Examples of celluloses, modified celluloses, and cellulose derivatives that may be used include cellulose, cellulose ethers, esters, and the like. Generally, any of the water-soluble cellulose ethers can be used. Those cellulose ethers include, among others, the various carboxyalkyl cellulose ethers, such as carboxyethyl cellulose and carboxymethyl cellulose (CMC); mixed ethers such as carboxyalkylethers, e.g., carboxymethyl hydroxyethyl cellulose (CMHEC); hydroxyalkyl celluloses, such as hydroxyethyl cellulose (HEC) and hydroxypropyl cellulose;

alkyhydroxyalkyl celluloses, such as methylhydroxypropyl cellulose; alkyl celluloses, such as methyl cellulose, ethyl cellulose, and propyl cellulose; alkylcarboxyalkyl celluloses, such as ethylcarboxymethyl cellulose; alkylalkyl celluloses, such as methylethyl cellulose; hydroxyalkylalkyl celluloses such as hydroxypropylmethyl cellulose; and the like. Generally, carboxyalkyl cellulose, carboxyalkyl hydroxyalkyl cellulose and the like may be used, wherein the alkyl groups may comprise methyl, ethyl or propyl groups. In addition, derivatized celluloses, such as a hydroxyethyl cellulose grafted with vinyl phosphonic acid may be used.

In some embodiments, the hydratable additive 104 may comprise a hydratable synthetic polymer. Examples of hydratable synthetic polymers and copolymers that can be utilized include, but are not limited to, polyacrylate, polymethacrylate, acrylamide-acrylate copolymers, acrylamide homopolymers and copolymers (i.e., polyacrylamides), maleic anhydride methylvinyl ether copolymers, and any combination thereof.

Polymeric hydratable additives may have a molecular weight of 10,000 g/mol to 50,000,000 g/mol or greater. However, the methods of the present disclosure are particularly useful at the higher molecular weights because such polymer are typically more difficult to hydrate and possibly more sensitive to high shear degradation. Preferred embodiments may utilize polymeric hydratable additives having a molecular weight of 500,000 g/mol to 50,000,000 g/mol, or 1,000,000 g/mol to 50,000,000 g/mol, or 5,000,000 g/mol to 50,000,000 g/mol, or 10,000,000 g/mol to 50,000,000 g/mol.

In some embodiments, the hydratable additive 104 may comprise a hydratable clay such as, but not limited to, bentonite, montmorillonite, laponite, and the like.

The hydratable additive 104 may be stored in a local hopper, bin, or storage trailer, for example, and may be provided to the mixing device 106 in a variety of ways. To ensure that the hydratable additive 104 freely flows from the storage hopper or trailer, a pneumatic vibrator may run intermittently, and humidity from atmospheric air may be controlled via one or more desiccant filters. In one or more embodiments, as illustrated, the hydratable additive 104 may be fed to an auger 112 that delivers the hydratable additive 104 directly into the mixing device 106. The auger 112 may be operated and otherwise configured to meter a predetermined flow of the hydratable additive 104 into the mixing device 106 to proportionately match the flow of the hydrating liquid 102 entering the mixing device 106.

In other embodiments, however, the hydratable additive 104 may be pre-wetted in a wetting chamber 114 prior to being introduced into the mixing device 106. In such embodiments, a portion of the hydrating liquid 102 may be pumped through a liquid feed line 116 and into the wetting chamber 114. The hydratable additive 104 may be introduced into the wetting chamber 114 to mix with the portion of the hydrating liquid 102 and thereby form a pre-wetted and partially hydrated fluid that is conveyed to the mixing device 106. The wetting container 114 may be, for example, a container, a vessel, a bowl or any type of receptacle suitable for pre-mixing the hydratable additive 104 with the portion of the hydrating liquid 102. In some embodiments, the hydratable additive 104 may be metered into the wetting container 114 at a rate between about 60 pounds per minute (lbs/min) and about 100 lbs/min. The wetting chamber 114 is most desirable when using fast hydrating polymers like high-viscosity friction reducer (HVFR) because it allows for a higher amount of dry powder to be added without the development of gel balls or fish eyes. For slower hydrating polymers like guar the pre-wetting chamber can optionally be eliminated.

In pre-wetting, only a small amount of hydrating liquid 102 is added to the wetting chamber 114. Preferably, the amount of hydrating liquid 102 and hydratable additive 104 are so that the concentration of hydratable additive 104 is at least 5 times (e.g., 5 times to 100 times, or 10 times to 75 times, or 20 times to 50 times) the concentration of the hydratable additive 104 in the mixture 118 described below.

The hydratable additive 104 or the pre-wetted hydratable additive 104 may be thoroughly mixed with the hydrating liquid 102 within the mixing device 106, which discharges a concentrated mixture 118 of partially or completely hydrated material. In some embodiments, as described in more detail below, the mixing device 106 may include or otherwise incorporate an extender (not shown), which may perform three primary functions: 1) to provide the motive flow to introduce the hydratable additive 104 into the mixing device 106, 2) to impart energy to the mixture to quickly hydrate the hydratable additive 104 without creating clumps or fish eyes, and 3) to separate and extend the polymer molecules in order to yield more structural benefit and exposure for hydration, thereby promoting very rapid hydration. The geometry of the extender may be optimized to ensure that the flow of the hydrating liquid 102 smoothly converges to prevent splashing (eddies) where the hydratable additive 104 is introduced into a jet of hydrating liquid 102. An illustrative system employing an extender to promote polymer hydration is POLYMXR FR-EZ™, which is available from PfP Industries.

In the mixture 118, the hydratable additive may be present at up to 300 ppt, or 10 ppt to 300 ppt, or 25 ppt to 250 ppt, or 50 ppt to 200 ppt, or 100 ppt to 150 ppt.

The resulting mixture 118 can be a) injected directly into a dilution stream or downstream equipment 124 or tubulars (not shown) or b) conveyed into a hydration tank 120 used to further hydrate (if needed) and temporarily store the mixture 118. In some embodiments, the resulting mixture 118 may be received at a suction manifold in fluid communication with one or both of the hydration tank 120 and the downstream equipment 124. In at least one embodiment, the suction manifold may include a plurality of suction lines (e.g., four or more). As mentioned below, the downstream equipment 124 may comprise, for example, a blender. In such embodiments, suction forces generated by the blender may draw the mixture 118 into and through the manifold, thus resulting in zero head pressure downstream of the mixing device 106. Moreover, when not using the hydration tank, the time from contacting the hydrating liquid and hydratable additive in the extender to introducing the resultant mixture into a dilution stream, downstream equipment, or tubular may be 1 minute or less (e.g., immediate to 1 minute, 1 second to 45 seconds, or 5 seconds to 30 seconds)

In some embodiments, the hydration tank 120 may comprise a circular, cylindrical structure. In such embodiments, the mixture 118 may be injected (introduced) into the hydration tank 120 at an angle tangent to the inner sidewall of the hydration tank 120, which induces swirl to the mixture 118 as it enters the hydration tank 120. The swirling flow may provide enough movement in the hydration tank 120 to keep any remaining hydratable additive 104 suspended within the hydrating liquid 102 until all the hydratable additive 104 is sufficiently hydrated. This may prove advantageous if the hydratable additive 104 used in the process is a slow hydrating material, and it may also help to maintain homogeneity within the hydration tank 120 while blending.

The hydration tank 120 also acts like a buffer to sudden changes in injection rate into the well. If there is a sudden drop in injection rate, it takes a finite amount of time for the hydration unit to adjust to a need for less polymer. The level of fluid in the hydration tank 120 allows the necessary time for the adjustment.

Residence time in the hydration tank 120 will vary, depending on the hydration time of the hydratable additive 104 and the targeted concentration of the polymer after dilution. In at least one embodiment, the mixture 118 may reside within the hydration tank 120 between 1 and 5 minutes, but could alternatively reside within the hydration tank 120 for a time period that is shorter or longer than 1 to 5 minutes, without departing from the scope of the disclosure, and depending on the hydration requirements of the hydratable additive 104. The fluid level within the hydration tank 120 may be adjusted to increase or decrease the residence time. For example, if a hydratable additive 104 having a slow hydration time is used, the residence time in the hydration tank 120 can be extended by increasing the fluid level. The fluid level within the hydration tank 120 may be maintained through operation of the mixing pump 108, and when associated sensors and controls determine that the fluid level is running high or low, the mixing pump 108 may slow down or speed up to adjust the fluid level.

A second or "discharge" pump 122 may be arranged downstream from the hydration tank 120 and configured to pump the mixture 118 from the hydration tank 120 to downstream equipment 124. The discharge pump 122 may be, for example, a progressive cavity pump, and the discharge rate of the discharge pump 122 may be determined based on the pump rate and required loading of the downstream equipment 124. The downstream equipment 124 may be, for example, a blender or dilution unit used to dilute the mixture 118 with a dilution fluid to form a fracturing fluid having a preferred concentration of the hydratable additive and to mix in the proppant to be placed in the created fracture. For example, the hydratable additive 104 may be present in a fracturing fluid at 0.25 ppt to 40 ppt, or 0.5 ppt to 5 ppt, or 5 to 15 ppt, or 10 to 40 ppt. In at least one embodiment, a flowmeter 126 may be arranged downstream from the discharge pump 122 to monitor the flow rate of the mixture 118 entering the downstream equipment 124.

While not expressly depicted, the blending system 100 may further include various valves, shut offs, sensors, and other devices to control the mixing efficiency and effectiveness of the mixing device 106 and to control the supply of the mixture 118 to the downstream equipment 124.

In some embodiments, the blending system 100 may be fully or partially automated. In such embodiments, the blending system 100 may include a control system 128 used to regulate, monitor, and maintain efficient operation of the blending system 100. The control system 128 may be in communication (either wired or wirelessly) with various components of the blending system 100. The mixing and discharge pumps 108, 122, for example, may be communicably coupled to the control system 128, which may monitor and regulate the flow rate of each pump 108, 122 to ensure that the fluid level within the hydration tank 120 is maintained at a proper level. The control system 128 may also regulate the feed rate of the hydratable additive 104 to ensure that the concentration of the hydratable additive 104 in the mixture 118 is accurate. If the mixing rate increases or decreases to adjust fluid level within the hydration tank 120, for instance, the feed rate of the hydratable additive 104 may also be adjusted autonomously by the control system 128.

Figure 2:
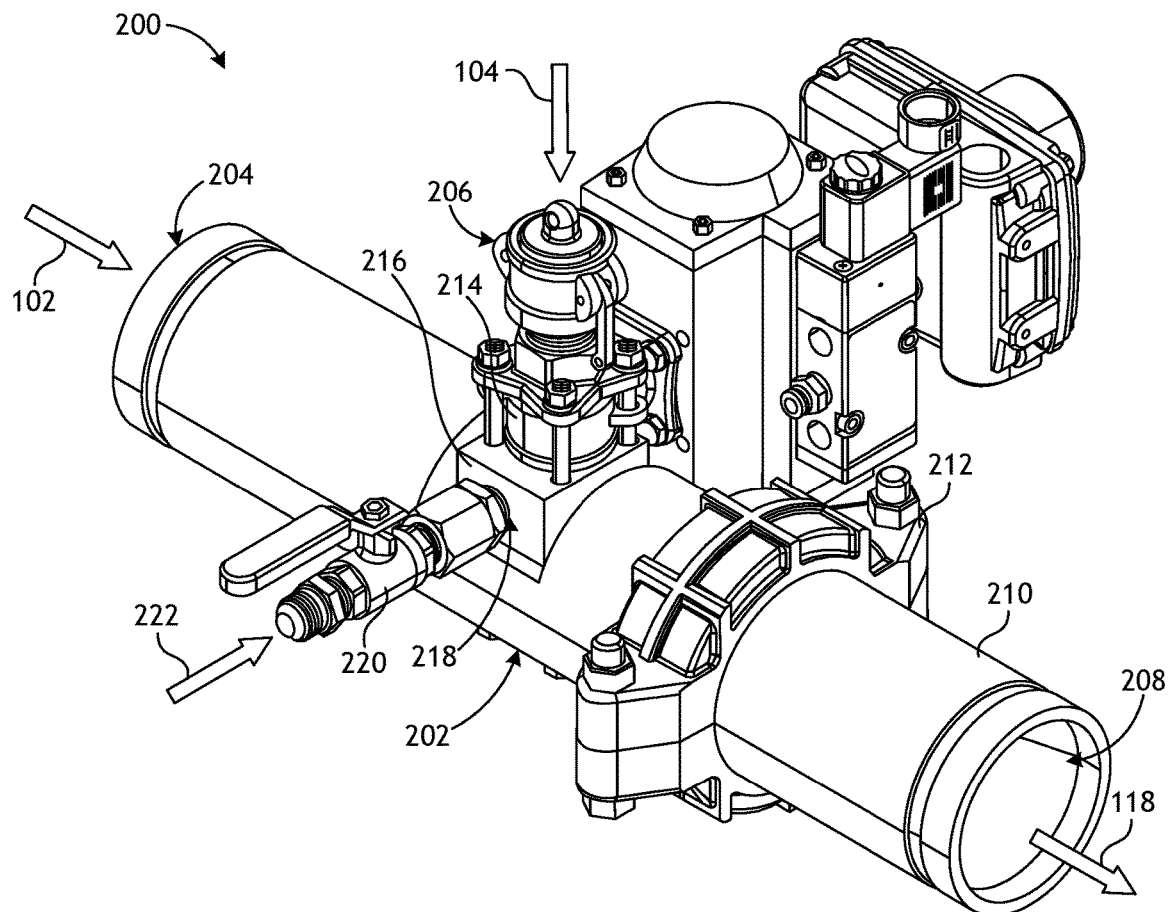
FIG. 2 is an isometric view of an example mixing device, according to one or more embodiments of the present disclosure.

As described above, the mixing device 106 includes an extender, which enables mixing the hydratable additive and the hydrating liquid in the extensional flow regime. By way of nonlimiting example, FIG. 2 is an isometric view of an example mixing device 200, according to one or more embodiments of the present disclosure. The mixing device 200 may be the same as or similar to the mixing device 106 of FIG. 1 and, therefore, may form part of the blending system 100 to help produce a mixture comprising a hydrated material (e.g., HVFR) that may be used in hydraulic fracturing fluids. As illustrated, the mixing device 200 may include an extender 202 having a fluid inlet 204, an additive inlet 206, and an outlet 208.

The hydrating liquid 102 may be introduced into the extender 202 via the fluid inlet 204, and the hydratable additive 104 may be introduced into the extender 202 via the additive inlet 206. As described above, the hydratable additive 104 may be fed into the additive inlet 206 either from the auger 112 (FIG. 1) or after being pre-wetted in the wetting container 114 (FIG. 1). The mixture 118 may exit the extender 202 via the outlet 208 to be conveyed into the hydration tank 120 (FIG. 1), as generally described above.

The geometry of the extender 202 may cause the hydrating liquid 102 to form a jet that flows through the extender 202 and generates a low-pressure vacuum that draws the hydratable additive 104 into the mixing device 106 to mix with the hydrating liquid 102. The formation of the jet also imparts energy to the mixture to help hydrate the hydratable additive 104.

In some embodiments, the outlet 208 may be formed by a diffuser 210 coupled to the extender 202 at a coupling 212. In other embodiments, however, the diffuser 210 may form an integral part or extension of the extender 202.

In some embodiments, the additive inlet 206 may include a valve 214 that regulates flow of the hydratable additive 104 into the extender 202. The valve 214 may comprise, for example, a ball valve that may be manually operated or operated by automation using the control system 128 (FIG. 1). In the illustrated embodiment, the additive inlet 206 may further include a spacer 216 interposing the valve 214 and the extender 202. The spacer 216 may define a flush port 218 and a flush valve 220 may be fluidly coupled to the spacer 216 at the flush port 216. The flush valve 220 may be actuated as needed to introduce a flushing fluid 222 into the extender 202 to remove any buildup of the hydratable additive 104 that may be coated on the inner walls of the spacer 216 and a suction port that feeds the hydratable additive 104 into the extender 202. Similar to the valve 214, the flush valve 220 may be manually operated or operated by automation using the control system 128 (FIG. 1).

When it is desired to flush the system, the valve 214 may be closed (either manually or automated), and the flush valve 220 may be opened (either manually or automated) to allow the flushing fluid 222 to enter the spacer 216 and the extender 202. The flushing fluid 222 may be any fluid that may sufficiently remove built-up hydratable additive 104 including, but not limited to, water (e.g., fresh or salt), a gas (e.g., air, nitrogen, carbon dioxide, etc.), a hydrocarbon (e.g., ethanol, methanol, etc.), or any combination thereof. In at least one embodiment, the flushing fluid 222 may comprise a portion of the hydrating liquid 102 separated from the main portion and piped to the flush valve 220.

Figure 3:
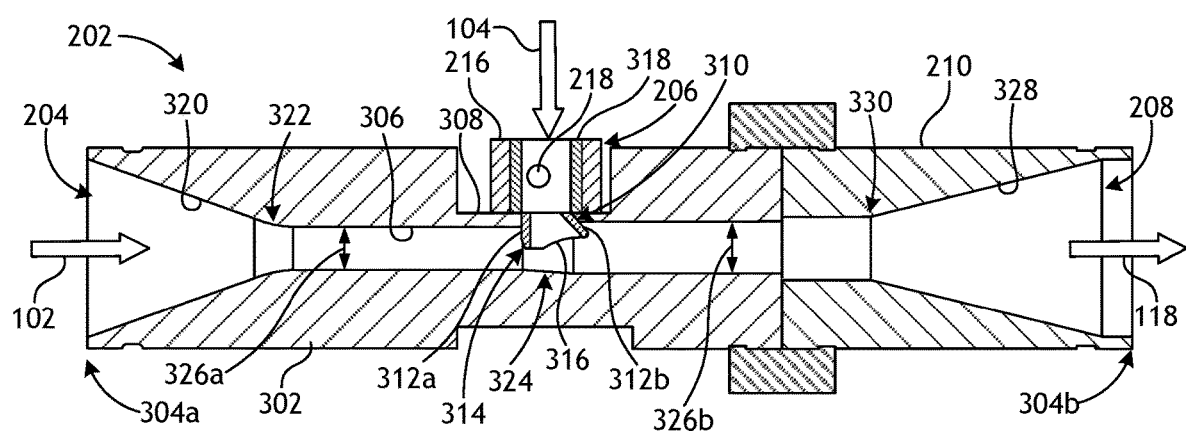
FIG. 3 is a cross-sectional side view of one embodiment of the extender of FIG. 2.

FIG. 3 is a cross-sectional side view of a nonlimiting embodiment of the extender 202. As illustrated, the extender 202 includes an elongate body 302 having a first end 304*a* and a second end 304*b*. The fluid inlet 204 is provided at the first end 304*a*, the outlet 208 is provided at the second end 304b, and a throat 306 extends between the fluid inlet 204 and the outlet 208. In some embodiments, the extender 202 may be made of a metal, such as carbon steel, stainless steel (e.g., polished stainless steel, chrome plated steel, etc.), aluminum, any alloys thereof, or any combination thereof. Alternatively, the extender 202 may be made of a plastic or polymer, such as polytetrafluoroethylene (PTFE or TEFLON®), NYLON®, HYLON®, polyvinyl chloride (PVC), chlorinated polyvinyl chloride (CPVC), or any combination thereof. In one or more embodiments, a hydrophobic coating may be applied to the inner walls of some or all of the extender 202. In yet other embodiments, the inner walls of some or all of the extender 202 may be polished to reduce friction.

Only a portion of the additive inlet 206 is depicted in FIG. 3. More particularly, the valve 214 (FIG. 2) is omitted, but the spacer 216 is depicted and defines the flush port 218 through which the flushing fluid 222 (FIG. 2) can be injected into the extender 202. In the illustrated embodiment, a recessed portion or "cutout" 308 is defined in the outer wall of the body 302, and the additive inlet 206 may be secured to the extender 202 within the cutout 308. Mounting the additive inlet 206 to the extender 202 within the cutout 308 helps to mitigate the occurrence of the hydratable additive 104 coating (covering) the inner walls of the additive inlet 206.

The additive inlet 206 may further include a suction port 310 that extends from the spacer 216 and into the throat 306 of the extender 202 at an intermediate point between the first and second ends 304a,b. The suction port 310 may be generally cylindrical and may expand or otherwise flare outward as it extends into the throat 306. In such embodiments, the diameter of the suction port 310 at or near the spacer 216 may be smaller than the diameter of the suction port 310 at its opposing end within the throat 306. This may prove advantageous in providing a larger discharge area for the hydratable additive 104 to be combined with the hydrating fluid 102 flowing through the throat 306.

In some embodiments, a leading (upstream) edge 312a of the suction port 310 may extend deeper (further) into the throat 306 as compared to a trailing (downstream) edge 312b of the suction port 310. This may prove advantageous in helping to prevent the incoming hydratable additive 104 from rebounding off the jet of hydrating fluid 102 flowing through the throat 306 and splashing back onto portions of the suction port 310. Moreover, in at least one embodiment, the leading edge 312a may define or provide a beveled bottom edge 314 and the suction port 310 may define a chamfered portion 316 that facilitates the transition between the leading and trailing edges 312a,b. The beveled bottom edge 314 and the chamfered portion 316 may be designed to help minimize or prevent splashing of the hydratable additive 104 as it is introduced into the throat 306.

In some embodiments, the suction port 310 may be made of a metal, such as carbon steel, stainless steel (e.g., polished stainless steel, chrome plated steel, etc.), aluminum, any alloys thereof, or any combination thereof. Alternatively, the suction port 310 may be made of a plastic or a polymer, such as polytetrafluoroethylene (PTFE or TEFLON®), NYLON®, HYLON®, polyvinyl chloride (PVC), chlorinated polyvinyl chloride (CPVC), or any combination thereof. In yet other embodiments, or in addition thereto, all or a portion of the spacer 216 and the suction port 310 may be lined with a lubricious material 318, such as CPVC. The lubricious material 318 may help repel the hydratable additive 104 and help facilitate a cleaner flushing when the flush port 218 is used to introduce the flushing fluid 222 (FIG. 2) to remove any buildup of the hydratable additive 104 that may be coated on the inner walls of the spacer 216 and the suction port 310. In at least one embodiment, the lubricious material 318 may further line the inner walls of the valve 214 (FIG. 2).

In embodiments that include flushing capabilities, the extender 202 may be cleaned and flushed at periodic intervals, such as at every 20 minutes of operation, or every 30 minutes, every hour, etc. In such embodiments, the control system 128 (FIG. 1) may autonomously control operation of the flushing operations. The control system 128 may also use various flow and pressure measurements to ensure that the extender 202 is maintaining suitable suction conditions. In the event any parameters deviate from normal values, the control system 128 may cause the valve 214 (FIG. 2) to close to eliminate a backflush condition through the suction line, and initiate a flush of the extender 202.

The extender 202 may also be flushed before and/or after the mixing process is completed. Flushing the extender 202 prior to starting a mixing process may prove advantageous since if there is any hydratable additive 104 already built up on the inner walls of the extender 202 (e.g., the valve 214 of FIG. 2, the spacer 216, and the suction port 310), it will have already absorbed water and softened, thus making it much easier to flush it as opposed to a fresh build-up of the hydratable additive 104. In some embodiments, the entire fluid pressure force of the mixing pump 108 (FIG. 1) may be used in the flushing process.

The throat 306 may form at least a portion of the elongated passageway described herein above that helps elongate and unfold the polymer structure of the hydratable additive 104 with minimum damage. Accordingly, the elongated passageway and the throat 306 may comprise the same structure and may be referred to herein interchangeably. More specifically, the geometry of the extender 202 may help ensure that the hydrating liquid 102 flowing through the throat 306 smoothly converges and mitigates splashing where the hydratable additive 104, especially dry hydratable additive 104, is introduced into the stream at the suction port 310. More particularly, the fluid inlet 204 may define or otherwise provide a converging portion 320 that tapers inward to form a nozzle. The hydrating liquid 102 forms a jet as it is forced to transition from the converging portion 310 to the throat 306.

In some embodiments, the converging portion 320 may transition to the throat 306 at an arcuate transition 322 that exhibits a radius. As opposed to a sharp corner transition, the arcuate transition 322 provides smooth and curved transition walls. The radius and arcuate length of the arcuate transition 322 may be determined based on the remaining geometry of the extender 202. In at least one embodiment, the arcuate length of the arcuate transition 322 may be about 2.0 inches, but could alternatively be less than or greater than 2.0 inches, without departing from the scope of the disclosure. The arcuate transition 322 may help the flow of the hydrating liquid 102 to become extensional and smooth, with little or no turbulence, as it forms the jet flowing into the throat 306, and smoother flow of the hydrating liquid 102 may help prevent splashing as the hydratable additive 104 enters the throat 306 at the suction port 310.

During example operation, in some embodiments, opening of the valve 214 (FIG. 2) to introduce the hydratable additive 104 may be delayed for a short period (e.g., 5 or more seconds) to allow the flow of the hydrating fluid 102 through the throat 306 to become extensional. Once proper conditions are attained, the valve 214 can be opened to start feeding the hydratable additive 104 and forming the mixture 118.

In some embodiments, the diameter of the throat 306 may increase at or near the suction port 310 and otherwise where the hydratable additive 104 is introduced into the throat 306. More specifically, the throat 306 may define an expansion transition 324 that increases the diameter of the throat 306 in the downstream direction. Consequently, the diameter 326a of the throat 306 upstream from the expansion transition 324 may be smaller than the diameter 326b of the throat 306 downstream from the expansion transition 324. Increasing the diameter of the throat 306 at or near the suction port 310 may prove advantageous in removing the jet of hydrating fluid 102 from the walls of the throat 306 at that point so that it does not impinge directly on abrupt structural edges of the suction port 310. The expansion transition 324 also provides additional room for the hydratable additive 104 to be introduced into the throat 306.

The diffuser 210 extends the length of the throat 306 and provides or otherwise defines a diverging portion 328 that tapers outward in the downstream direction. The throat 306 may transition to the diverging portion 328 at a transition 330. In some embodiments, as illustrated, the transition 330 may provide a sharp corner transition. In other embodiments, however, the transition 330 may provide a smooth, curved transition across an arcuate portion having a radius, without departing from the scope of the disclosure.

In a preferred embodiment, the hydratable additive 104 comprises a polymer, such as a polyacrylamide. The extensional flow generated by the extender 202 tends to keep the polymer structure of the hydratable additive 104 more intact, and tends to stretch the polymer without breaking it, thus improving its shear resistance and dynamic proppant transport capability. The mixing device 200 (FIG. 2) may be able to produce a flow of the hydrating fluid 102 with a minimum amount of wasted energy in the form of turbulence, and the hydratable additive 104 (e.g., polymer) is added to this stream. This allows the hydratable additive 104 to be wetted and then begin its structure development. The smooth, extensional flow pattern helps achieve elongation and unfolding of the polymer structure with a minimum of damage (e.g., shortening of the polymer chain).

The downstream hydration tank 124 (FIG. 1) may also help improve shear resistance and dynamic proppant transport capability in that it may keep the hydratable additive 104, which is now partially hydrated, in a constant but controlled movement (e.g., spiral flow). This step may complete the stretching of the polymer chains and maximize the area that the polymer structure covers. Combining these two blending steps may complete the required structural development process.

Maximizing the polymer concentration that is reached using this process allows the mixing device 106, 200 (FIGS. 1 and 2) to support a relatively high polymer concentration and, in turn, be capable of handling of the polymer requirement for a high injection rate through the downstream equipment 124 (FIG. 1).

To facilitate a better understanding of the embodiments of the present invention, the following examples of preferred or representative embodiments are given. In no way should the following examples be read to limit, or to define, the scope of the invention.

EXAMPLES

Dynamic Proppant Transport Capability (DPTC) Test Procedure.

The DPTC test procedure can be used to compare the relative ability of fluids to suspend proppant particles. Complete details on the DPTC test procedure can be found in U.S. Provisional Patent App. Ser. No. 62/770,871 entitled "Apparatuses, Systems, and Methods for Dynamic Proppant Transport Fluid Testing," and filed on Nov. 23, 2018, the contents of which are hereby incorporated by reference in their entirety. The test is performed in a Model 20 Constant Speed Blender available from OFITE. The reference sample is 250 mL of water and 60 grams of 40/70 sand (equivalent to 2 ppg). A sample tested by this procedure is 250 mL of water, 60 grams of 40/70 sand, and desired concentration of hydratable additive (which may be hydrated according to a desired method). A "traditional shear hydration" method herein refers to adding the water, sand, and hydratable additive to the blender sequentially within 5 seconds and beginning the test. There is no additional hydration time. Each sample is subjected to the following procedure.

(1) The samples are mixed in the blender at 1200 RPM for 12 seconds, which represents the mixing time spent in the blender equipment during pumping.

(2) The RPM is increased for a corresponding time as prescribed in the description. If one is not specified, 5 min at 4500 RPM is used.

(3) The RPM is reduced over time at a rate no faster than 50 RPM/sec until sand accumulates on the bottom of the blender jar.

(4) The RPM is increased to re-suspend the sand and then decreased at a rate no faster than 50 RPM/sec to observe sand accumulation. This is repeated at least 5 times until a minimum RPM to suspend the sand is determined.

The % improvement in a dynamic proppant transport capability is the minimum RPM of the reference sample minus the minimum RPM of the sample where the difference is then divided by the minimum RPM of the reference sample and multiplied by 100.

Example 1

To evaluate the ability of a friction reduction additive to aid in proppant transport through surface equipment, a test procedure was developed that simulated the dynamics of moving proppant through a blender tub and high-pressure pumps. For the test procedure to be representative of what occurs at a wellsite, the test procedure must take into account the time and mixing that occurs when the friction reducer additive (a hydratable additive), base fluid (e.g., comprising the hydrating fluid), and proppant come together in the blender tub and the reduction in fluid velocity that occurs when the fracturing fluid/slurry leaves the blender and moves into the suction manifolds of the high pressure pumps. To simulate this process the following procedure was developed.

(1) All tests were run using 250 mL of fresh water and 30 grams of 40/70 sand (equivalent to 1 pound per gallon (ppg)) at room temperature.

(2) Add the water, sand, and the friction reducer (FR) being tested into the blender and mix for 7 seconds at 1200 RPM. The time interval of 7 seconds was chosen as a representative time from the fluid's entering the suction manifold (of the blender) until the time it leaves the discharge manifold (for a treatment that is being pumped at approximately 90 barrels per minute).

(3) At the end of 12 seconds, reduce the setting to 700 RPM. The 700 RPM setting was chosen as being representative of the fluid velocity/shear rate that is achieved going through the high-pressure pumps.

(4) Observe for 30 seconds at 700 RPM to see if any sand accumulates on the bottom of the blender jar. (As a point of reference, sand drops out of water (containing no polymer) at ±890 RPM.)

(5) Document the test results with a picture of the bottom of the blender jar.

Using said procedure, four samples were tested: (1) 1 gpt (gallon additive per 1000 gallons of fluid) of emulsion/liquid FR hydrated by a method that simulates addition at the blender; (2) 1 gpt liquid HVFR-2 hydrated by a method that simulates addition at the blender; (3) solid HVFR-1 hydrated using an extender/extensional flow described herein at a concentration corresponding to the polymer concentration in 1 gpt of the liquid equivalent to HVFR-1; and (4) solid HVFR-1 hydrated using an extender/extensional flow described herein at a concentration corresponding to the polymer concentration in 0.5 gpt of the liquid equivalent to HVFR-1. Sand settling was observed for Samples 1 and 2 and not observed for samples 3 and 4.

Example 2

This example determines the HVFR concentration required to provide at least a 30% reduction in the RPM as compared to water with no polymer required to keep a 40/70 sand in suspension after first being subjected to a representative shear history at room temperature. The samples were 250 mL of water to which friction reducer at concentrations per Table 1 below and 60 grams of 40/70 sand (equivalent to 2 ppg) were added. The test was performed according to the DPTC test procedure.

Samples and different shear histories (combination of time and shear rate/RPM) utilized in this comparison and the settling results are provided in Table 1. The shear histories were chosen to equate to a representative time and shear rate that can occur during a fracturing treatment. The No Polymer control sample used for comparison had a minimum RPM of 883. HVFR-1L and HVFR-2L are liquid additives and used as provided. HVFR-1S is a solid additive that was hydrated by the extender/extensional flow methods of the present disclosure.

TABLE 2

| Sample | Shear History* | Minimum RPM | % Improvement in DPTC |
|---|---|---|---|
| 2 gpt HVFR-1L | 3 min at 3400 RPM | 669 | 24.2 |
| 2 gpt HVFR-1L | 5 min at 3400 RPM | 622 | 29.6 |
| 2 gpt HVFR-1L | 3 min at 4500 RPM | 688 | 22.1 |
| 2 gpt HVFR-1L | 5 min at 4500 RPM | 694 | 21.4 |
| 3 gpt HVFR-1L | 3 min at 3400 RPM | 544 | 38.4 |
| 3 gpt HVFR-1L | 5 min at 3400 RPM | 592 | 33.0 |
| 3 gpt HVFR-1L | 3 min at 4500 RPM | 640 | 27.5 |
| 3 gpt HVFR-1L | 5 min at 4500 RPM | 710 | 19.6 |
| 2 gpt HVFR-2L | 3 min at 3400 RPM | 639 | 27.6 |
| 2 gpt HVFR-2L | 5 min at 3400 RPM | 668 | 24.3 |
| 2 gpt HVFR-2L | 3 min at 4500 RPM | 772 | 12.6 |
| 3 gpt HVFR-2L | 3 min at 3400 RPM | 643 | 27.2 |
| 3 gpt HVFR-2L | 5 min at 3400 RPM | 671 | 24.0 |
| 3 gpt HVFR-2L | 3 min at 4500 RPM | 704 | 20.3 |
| 3 gpt HVFR-2L | 5 min at 4500 RPM | 728 | 16.5 |
| Eq 2 gpt HVFR-1S** | 3 min at 3400 RPM | 637 | 27.9 |
| Eq 2 gpt HVFR-1S | 5 min at 3400 RPM | 655 | 25.8 |
| Eq 2 gpt HVFR-1S | 3 min at 4500 RPM | 567 | 35.8 |
| Eq 2 gpt HVFR-1S | 5 min at 4500 RPM | 584 | 33.9 |
| Eq 3 gpt HVFR-1S | 3 min at 3400 RPM | 494 | 44.1 |
| Eq 3 gpt HVFR-1S | 5 min at 3400 RPM | 511 | 42.1 |
| Eq 3 gpt HVFR-1S | 3 min at 4500 RPM | 463 | 47.6 |
| Eq 3 gpt HVFR-1S | 5 min at 4500 RPM | 550 | 37.7 |

*The Shear Histories listed equate to the following:
3 minutes at 3400 RPM simulates the shear history of a fluid being pumped at 69 barrels per minute (BPM) through 8730 ft of 5.5 inch OD casing;
5 minutes at 3400 RPM simulates the shear history of a fluid being pumped at 69 BPM through 14,550 ft of 5.5 inch OD casing;
3 minutes at 4500 RPM simulates the shear history of a fluid being pumped at 94 BPM through 11,700 ft of 5.5 inch OD casing; and
5 minutes at 4500 RPM simulates the shear history of a fluid being pumped at 94 BPM through 19,500 ft of 5.5 inch OD casing.
**Eq #gpt HVFR-1 refers to a concentration of HVFR-1 that contains the same HVFR-1 concentration in dry form as what is present in the liquid additive HVFR-1 at # gpt.

Almost all of the samples prepared with a HVFR hydrated by the extender/extensional flow methods of the present disclosure provide greater than 30% improvement in sand suspension. However, only a few of the samples prepared with HVFR liquid polymer additives pass such threshold. This example demonstrates that hydratable additives that are hydrated by the extender/extensional flow methods of the present disclosure are more shear stable would have greater dynamic proppant transport.

Example 3

This example investigates the use of a liquid hydratable additive in the extender/extensional flow methods of the present disclosure.

Three samples were prepared according to the following test methods using (a) 3 gpt liquid HVFR-1, (b) solid HVFR-1 hydrated using an extender/extensional flow described herein at a concentration corresponding to the polymer concentration in 3 gpt of the liquid equivalent to HVFR-1, or (c) 3 gpt liquid HVFR-1 hydrated using an extender/extensional flow described herein. The samples were 250 mL of water to which friction reducer at the foregoing concentrations and 60 grams of 40/70 sand (equivalent to 2 ppg) were added. The test was performed according to the DPTC test procedure.

Samples and different shear histories (combination of time and shear rate/RPM) utilized in this comparison and the settling results are provided in Table 2. The No Polymer control sample used for comparison had a minimum RPM of 883.

TABLE 2

| Sample | Shear History | Minimum RPM | % Improvement in DPTC |
|---|---|---|---|
| 3 gpt HVFR-1L | 3 min at 3400 RPM | 544 | 38.4 |
| 3 gpt HVFR-1L | 5 min at 3400 RPM | 592 | 33.0 |
| 3 gpt HVFR-1L | 3 min at 4500 RPM | 640 | 27.5 |
| 3 gpt HVFR-1L | 5 min at 4500 RPM | 710 | 19.6 |
| Eq 3 gpt HVFR-1S* | 3 min at 3400 RPM | 494 | 44.1 |
| Eq 3 gpt HVFR-1S* | 5 min at 3400 RPM | 511 | 42.1 |
| Eq 3 gpt HVFR-1S* | 3 min at 4500 RPM | 463 | 47.6 |
| Eq 3 gpt HVFR-1S* | 5 min at 4500 RPM | 550 | 37.7 |
| 3 gpt HVFR-1L* | 3 min at 3400 RPM | 494 | 41.6 |
| 3 gpt HVFR-1L* | 5 min at 3400 RPM | 570 | 35.4 |
| 3 gpt HVFR-1L* | 3 min at 4500 RPM | 659 | 25.4 |
| 3 gpt HVFR-1L* | 5 min at 4500 RPM | 644 | 27.1 |

*Samples were hydrated using an extender/extensional flow described herein.

Hydrating the HVFR using an extender/extensional flow described herein improves the sand suspension in the fluid whether the HVFR is solid or liquid. However, in the hydration methods using an extender/extensional flow described herein, a solid additive appears to be superior to a liquid additive.

Example 4

Three samples of 12 ppt AFRD™-12 (anionic high viscosity friction reducer, available from PfP Industries) in water were prepared by different methods. The first method was 13 seconds of blending in a Waring blender at 1250 RPM. The second method was using an extender/extensional flow described herein followed by mixing for 5 seconds in the Waring blender at 1250 RPM. The third method was using an extender/extensional flow described herein to produce a 48 ppt concentrate of AFRD™-12 that was then diluted 3:1 and mixed for 5 seconds in the Waring blender at 1250 RPM to produce the 12 ppt AFRD™-12 in water. The 13 seconds for the blending in the first method was chosen because that is the approximate time for the second and third methods.

The viscosity (OFITE 900 viscometer at 300 rpm and 80° F.) of the three samples is reported in Table 4.

TABLE 4

| Sample | AFRD™-12 Conc. (ppt) | Viscosity (cps) | | | |
|---|---|---|---|---|---|
| | | 1 minute | 2 minutes | 3 minutes | 5 minutes |
| 1$^{st}$ Method | 12 | 4.2 | 7.4 | 10.1 | 12.6 |
| 2$^{nd}$ Method | 12 | 5.7 | 12.1 | 14.5 | 16.1 |
| 3$^{rd}$ Method | 12 | 7.5 | 10.2 | 11.2 | 12.4 |
| 1$^{st}$ Method | 24 | 8.0 | 14.8 | 21.3 | 24.1 |
| 2$^{nd}$ Method | 24 | 17.1 | 28.5 | 33.0 | 33.5 |

Test results for the 12 ppt AFRD™-12 samples indicate that the extender/extensional flow described herein (2$^{nd}$ Method) creates an increase in the rate of polymer hydration/viscosity build-up as compared to the blending (1$^{st}$ Method) that varies from about 22% to almost 40% depending on what time increment is being analyzed. The viscosity comparison also showed an increase in peak viscosity of approximately 22% at the 5-minute mark. The test utilizing the 48 ppt concentrate (3$^{rd}$ Method) showed an even faster initial hydration rate but later reading showing viscosity fluctuations are attributed to insufficient mixing (only 5 seconds) of the concentrate and dilution water before the viscosity measurements were started.

The test results on the 24 ppt AFRD™-12 samples indicated that the initial build-up for the extender/extensional flow described herein (2$^{nd}$ Method) was approximately twice as fast as the blending (1$^{st}$ Method). Along with the faster viscosity build-up that was also a bigger difference in the viscosity readings at 5 minutes with approximately 39% more viscosity (33.5/24.1 cps) for the extender/extensional flow described herein (1$^{st}$ Method) than the blending (1st Method). If the evaluation of the viscosity profile for each sample was extended, it is likely that the peak viscosities would trend to a similar value.

Example 5

DPTC was analyzed for the for three samples: 3 gpt XCEL™ 200 (acrylic acid polymer, available from Xcel Surfaces) in water mixed in a Waring blender for 13 seconds, 12 ppt AFRD™-12 sample by the 2$^{nd}$ Method of Example 4, and 12 ppt AFRD™-12 sample by the 3rd Method of Example 4. The results are provided in Table 5.

TABLE 5

| Sample | Minimum RPM | % Improvement in DPTC |
|---|---|---|
| Water | 883 | n/a |
| 3 gpt XCEL ™ 200 | 710 | 19.6 |
| 12 ppt AFRD ™-12 2$^{nd}$ Method | 661 | 25.1 |
| 12 ppt AFRD ™-12 3$^{rd}$ Method | 557 | 37.0 |

The DPTC again verified the value of hydrating the high molecular weight AFRD™-12 polyacrylamide using the extender/extensional flow described herein. Both samples produced with the extender/extensional flow described herein retained superior dynamic transport properties as compared to the same polymer concentration (in a suspension) that was hydrated utilizing a mixer and the same mixing time as the extender/extensional flow samples prior to being subjected to a representation shear history.

Further, the sample produced with the 3rd Method outperformed the sample produced with the 2$^{nd}$ method. Without being limited by theory, this may be that the added initial viscosity of the 48 ppt concentrate sample before dilution continues to protect the structure development of the polymer during its early hydration.

Embodiments disclosed herein include:

A. A method that includes flowing a hydrating liquid in an extensional flow regime through an elongated passageway of an extender, wherein a flow rate of the hydrating liquid and a diameter of the elongated passageway are sufficient to achieve a Reynolds number of 20,000 or greater, and adding a hydratable additive to the hydrating liquid in the elongated passageway to produce a mixture comprising the hydratable additive that is at least partially hydrated.

B. A hydratable additive concentrate comprising a hydratable additive that is at least substantially hydrated and a hydrating liquid, wherein the hydratable additive concentrate is a mixture produced according to a method comprising flowing a hydrating liquid in a extensional flow regime through an elongated passageway of an extender, wherein a flow rate of the hydrating liquid and a diameter of the elongated passageway are sufficient to achieve a Reynolds number of 20,000 or greater, and adding a hydratable additive to the hydrating liquid in the elongated passageway to produce a mixture comprising the hydratable additive that is at least partially hydrated.

C. A fracturing fluid that includes proppant, a dilution fluid, and a hydratable additive concentrate comprising a hydratable additive that is at least substantially hydrated and a hydrating liquid, the hydratable additive concentrate being produced by flowing a hydrating liquid in a extensional flow regime through an elongated passageway of an extender, wherein a flow rate of the hydrating liquid and a diameter of the elongated passageway are sufficient to achieve a Reynolds number of 20,000 or greater, and adding a hydratable additive to the hydrating liquid in the elongated passageway to produce a mixture comprising the hydratable additive that is at least partially hydrated.

D. A hydratable additive concentrate comprising a hydratable additive that is at least substantially hydrated and a hydrating liquid, wherein the hydratable additive concentrate has a % improvement in dynamic proppant transport capability (DPTC) that is greater than the % improvement in DPTC for a same mixture composition produced under traditional shear hydration as determined by a DPTC test that includes a shear history equivalent to 5 min at 4500 RPM.E.

A blending system that includes a mixing device that mixes a hydrating liquid and a hydratable additive to initiate hydration of the hydratable additive, the mixing device including an extender that receives the hydrating liquid and the hydratable additive, an elongated passageway defined by the extender and having a geometry that results in the hydrating liquid flowing therethrough in an extensional flow regime, wherein a flow rate of the hydrating liquid and a diameter of the elongated passageway are sufficient to achieve a Reynolds number of 20,000 or greater, and an additive inlet in fluid communication with the elongated passageway to introduce a hydratable additive into the elongated passageway, wherein adding the hydratable additive to the hydrating liquid in the elongated passageway produces a mixture comprising the hydratable additive that is at least partially hydrated.

F. A mixing device that includes an extender having a fluid inlet for receiving a hydrating liquid and an outlet for discharging a mixture of the hydrating liquid and a hydratable additive, an elongated passageway extending between the fluid inlet and the outlet and having a geometry that results in the hydrating liquid flowing therethrough in an extensional flow regime, wherein a flow rate of the hydrating liquid and a diameter of the elongated passageway are sufficient to achieve a Reynolds number of 20,000 or greater, and an additive inlet coupled to the extender to introduce the hydratable additive into the elongated passageway, wherein adding the hydratable additive to the hydrating liquid in the elongated passageway produces the mixture comprising the hydratable additive that is at least partially hydrated.

Each of embodiments A, B, C, D, E, and F may have one or more of the following additional elements in any combination: Element 1: further comprising prewetting the hydratable additive with a portion of the hydrating liquid before introduction of the hydratable additive to the elongated passageway, wherein a concentration of the hydratable additive being prewetted is at least 5 times higher than a concentration of the hydratable additive in the mixture. Element 2: further comprising conveying the mixture from the extender to a vessel, and subjecting the mixture to low shear mixing within the vessel. Element 3: wherein the hydratable additive is at least substantially hydrated within 5 minutes in the vessel. Element 4: further comprising conveying the mixture from the extender directly to a blender. Element 5: wherein the mixture has a viscosity within 50% of peak within 5 minutes of exiting the extender. Element 6: wherein the mixture has a viscosity within 50% of peak in less than 1 minute of exiting the extender. Element 7: wherein the mixture has a viscosity within 85% of peak in 2 minutes of exiting the extender. Element 8: wherein the flow rate of the hydrating liquid is at least 50 gallons per minute through the elongated passageway and the diameter of the elongated passageway is 45 mm or less. Element 9: wherein the hydratable additive is present in the mixture at 10 pounds to 300 pounds per 1000 gallons of the hydrating fluid. Element 10: further comprising mixing the mixture with proppant and a dilution fluid to form a fracturing fluid, injecting the fracturing fluid into a subterranean formation under conditions sufficient to create and/or extend at least one fracture in the subterranean formation, and placing the proppant in the at least one fracture. Element 11: wherein the hydratable additive is present in the fracturing fluid at 0.25 pound to 40 pounds per 1000 gallons of the hydrating fluid. Element 12: wherein the hydratable additive comprises a powder polymer having a water content of 10 wt % or less. Element 13: wherein the hydratable additive comprises a polymer suspended in a fluid. Element 14: wherein the hydratable additive comprises a polymer suspended in an emulsion. Element 15: wherein the polymer has a molecular weight of 10,000 g/mol to 50,000,000 g/mol. Element 16: wherein the hydratable additive comprises a clay. Element 17: wherein the mixture has a % improvement in dynamic proppant transport capability (DPTC) that is greater than the % improvement in DPTC for a same mixture composition produced under traditional shear hydration as determined by a DPTC test that includes a shear history of 5 min at 4500 RPM.

Element 18: wherein the hydrating liquid comprises water or a solution comprising water. Element 19: wherein the hydratable additive is selected from the group consisting of a polymer, a synthetic polymer, a clay, a polymer suspended in an aqueous fluid, a polymer suspended in an emulsion, and any combination thereof. Element 20: wherein the hydratable additive comprises a polymer having a molecular weight of 10,000 g/mol to 50,000,000 g/mol. Element 21: further comprising an auger operable to feed the hydratable additive into the elongated passageway. Element 22: further comprising a wetting chamber that receives the hydratable additive and a portion of the hydrating liquid and pre-wets the hydratable additive before feeding the hydratable additive into the elongated passageway. Element 23: further comprising a hydration tank that receives the mixture from the mixing device. Element 24: wherein the hydration tank comprises a circular, cylindrical structure and the mixture is introduced into the hydration tank at an angle tangent to an inner sidewall of the hydration tank to induce swirl to the mixture as the mixture enters the hydration tank. Element 25: further comprising a pump arranged downstream from the hydration tank to pump the mixture from the hydration tank to downstream equipment. Element 26: wherein the mixture has a % improvement in dynamic proppant transport capability (DPTC) that is greater than the % improvement in DPTC for a same mixture composition produced under traditional shear hydration as determined by a DPTC test that includes a shear history equivalent to 5 min at 4500 RPM.

Element 27: wherein the additive inlet includes a first valve that regulates flow of the hydratable additive into the elongated passageway. Element 28: further comprising a second valve fluidly coupled to the additive inlet and operable to introduce a flushing fluid into the extender. Element 29: wherein the additive inlet includes a suction port that extends into the elongated passageway at an intermediate point between the fluid inlet and the outlet. Element 30: wherein the suction port is cylindrical and flares outward as it extends into the elongated passageway. Element 31: wherein a diameter of the elongated passageway increases at or near the suction port. Element 32: wherein a leading edge of the suction port extends further into the elongated passageway as compared to a trailing edge of the suction port. Element 33: wherein the fluid inlet provides a converging portion that transitions to the elongated passageway across an arcuate transition, and wherein the fluid inlet converts the hydratable liquid into a jet that enters the elongated passageway in the extensional flow regime. Element 34: wherein the mixture exhibits a viscosity within 50% of peak in less than 1 minute of exiting the extender. Element 35: wherein the mixture exhibits a viscosity within 85% of peak in 2 minutes of exiting the extender. Element 36: wherein the hydratable additive is selected from the group consisting of a polymer, a synthetic polymer, a clay, a polymer suspended in an aqueous fluid, a polymer suspended in an emulsion, and any combination thereof. Element 37: wherein the hydratable additive comprises a polymer having a molecular weight of 10,000 g/mol to 50,000,000 g/mol. Element 28: wherein the mixture has a % improvement in dynamic proppant transport capability (DPTC) that is greater than the % improvement in DPTC for a same mixture composition produced under traditional shear hydration as determined by a DPTC test that includes a shear history equivalent to 5 min at 4500 RPM.

By way of non-limiting example, exemplary combinations applicable to A, B, C, D, E, and F include: Element 2 with Element 3; Element 6 with any of Elements 1-5; Element 5 with Element 6; Element 5 with Element 7; Element 9 with any of Elements 1-8; Element 10 with any of Elements 1-9; Element 11 with any of Elements 1-10; Element 5 with Element 11; Element 12 with any of Elements 1-11; Element 13 with any of Elements 1-11; Element 14 with any of Elements 1-11; Element 15 with any of Elements 12-14; Element 16 with any of Elements 1-11; Element 17 with any of Elements 1-16; Element 23 with Element 24; Element 23 with Element 25; Element 27 with Element 28; Element 29 with Element 30; Element 30 with Element 31; and Element 29 with Element 32.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
    flowing a hydrating liquid in an extensional flow regime through an elongated passageway of an extender, wherein a flow rate of the hydrating liquid and a diameter of the elongated passageway are sufficient to achieve a Reynolds number of 20,000 or greater; and
    adding a hydratable additive to the hydrating liquid in the elongated passageway to produce a mixture comprising the hydratable additive that is at least partially hydrated.

2. The method of claim 1, further comprising prewetting the hydratable additive with a portion of the hydrating liquid before introduction of the hydratable additive to the elongated passageway, wherein a concentration of the hydratable additive being prewetted is at least 5 times higher than a concentration of the hydratable additive in the mixture.

3. The method of claim 1, further comprising:
    conveying the mixture from the extender to a vessel; and
    subjecting the mixture to low shear mixing within the vessel.

4. The method of claim 3, wherein the hydratable additive is at least substantially hydrated within 5 minutes in the vessel.

5. The method of claim 1, further comprising conveying the mixture from the extender directly to a blender.

6. The method of any preceding claim, wherein the mixture has a viscosity within 50% of peak within 5 minutes of exiting the extender.

7. The method of claim 6, wherein the mixture has a viscosity within 50% of peak in less than 1 minute of exiting the extender.

8. The method of claim 6, wherein the mixture has a viscosity within 85% of peak in 2 minutes of exiting the extender.

9. The method of any preceding claim, wherein the flow rate of the hydrating liquid is at least 50 gallons per minute through the elongated passageway and the diameter of the elongated passageway is 45 mm or less.

10. The method of any preceding claim, wherein the hydratable additive is present in the mixture at 10 pounds to 300 pounds per 1000 gallons of the hydrating fluid.

11. The method of any preceding claim, further comprising:
    mixing the mixture with proppant and a dilution fluid to form a fracturing fluid;
    injecting the fracturing fluid into a subterranean formation under conditions sufficient to create and/or extend at least one fracture in the subterranean formation; and
    placing the proppant in the at least one fracture.

12. The method of claim 11, wherein the hydratable additive is present in the fracturing fluid at 0.25 pound to 40 pounds per 1000 gallons of the hydrating fluid.

13. The method of any preceding claim, wherein the hydratable additive comprises a powder polymer having a water content of 10 wt % or less.

14. The method of one of claims 1-12, wherein the hydratable additive comprises a polymer suspended in a fluid.

15. The method of one of claims 1-12, wherein the hydratable additive comprises a polymer suspended in an emulsion.

16. The method of one of claims 13-15, wherein the polymer has a molecular weight of 10,000 g/mol to 50,000,000 g/mol.

17. The method of one of claims 1-12, wherein the hydratable additive comprises a clay.

18. The method of any preceding claim, wherein the mixture has a % improvement in dynamic proppant transport capability (DPTC) that is greater than the % improvement in DPTC for a same mixture composition produced under traditional shear hydration as determined by a DPTC test that includes a shear history of 5 min at 4500 RPM.

* * * * *